No. 824,077.   
PATENTED JUNE 19, 1906.  
J. C. HERRMANN.  
CAR ROOF DOOR.  
APPLICATION FILED FEB. 1, 1906.
4 SHEETS—SHEET 4.
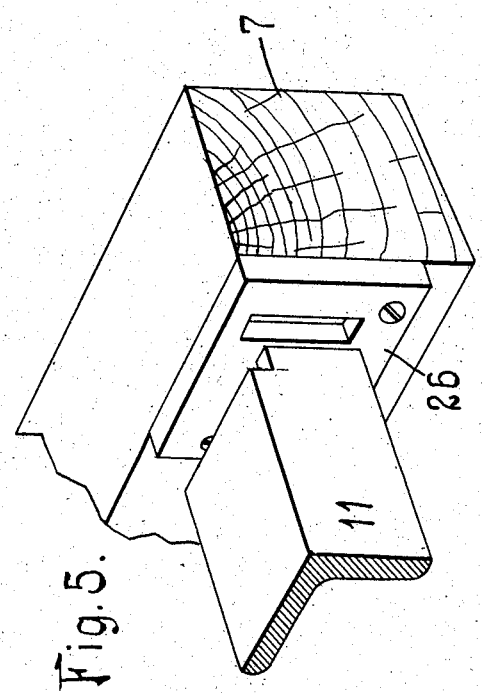
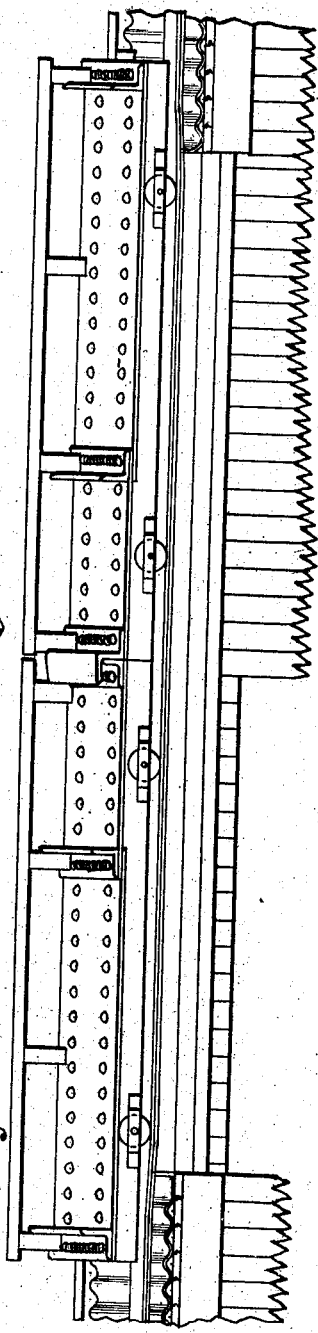
Witnesses  
A. J. McCauley  
Nells L. Church
Inventor:  
Julius C. Herrmann  
by Bakewell & Cornwall  
Atty's.

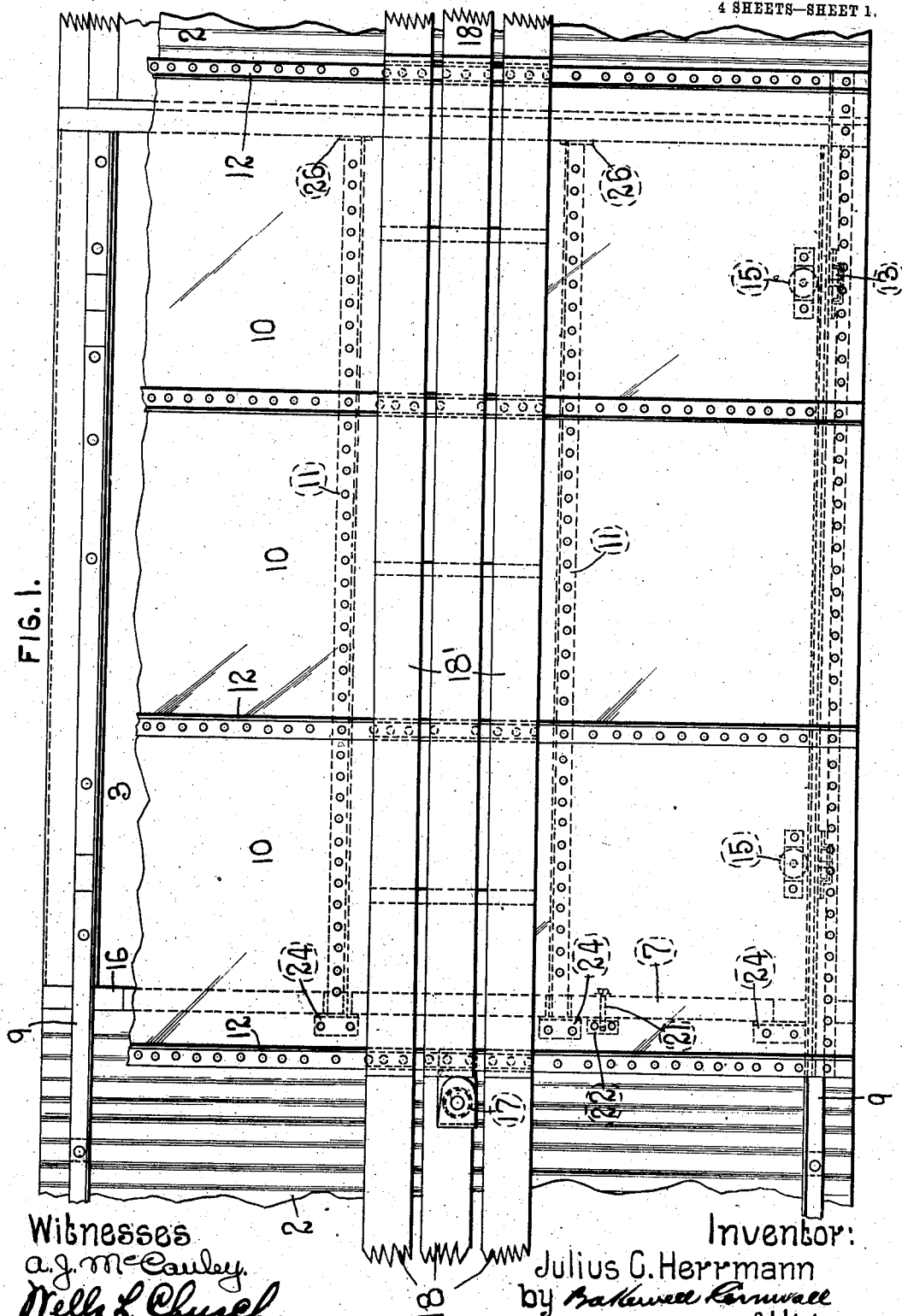

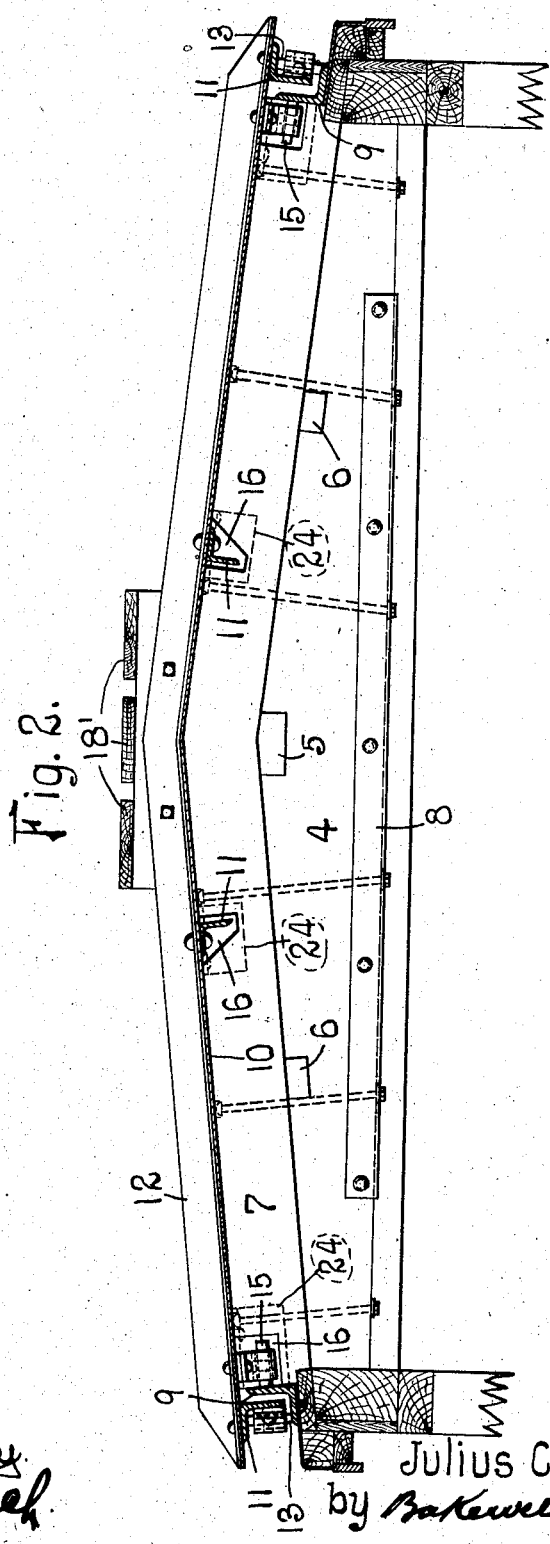

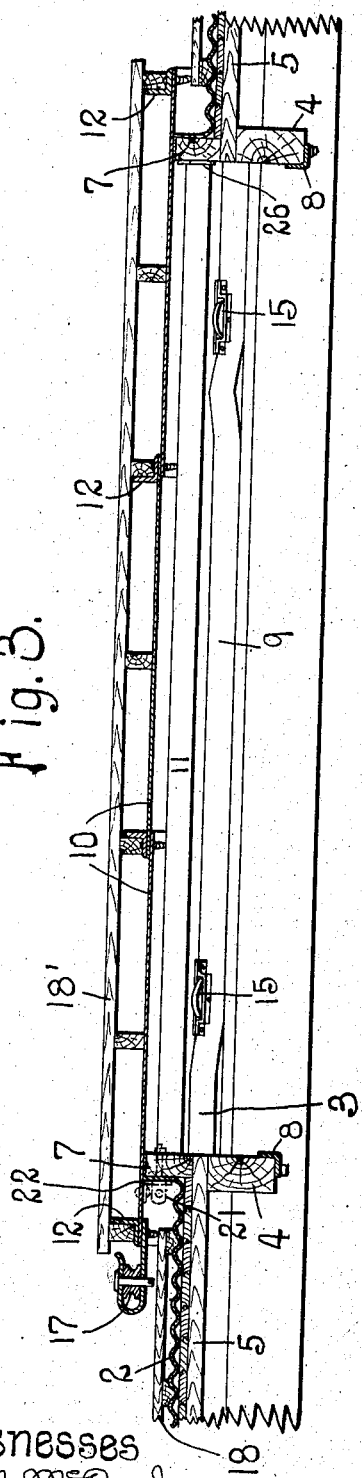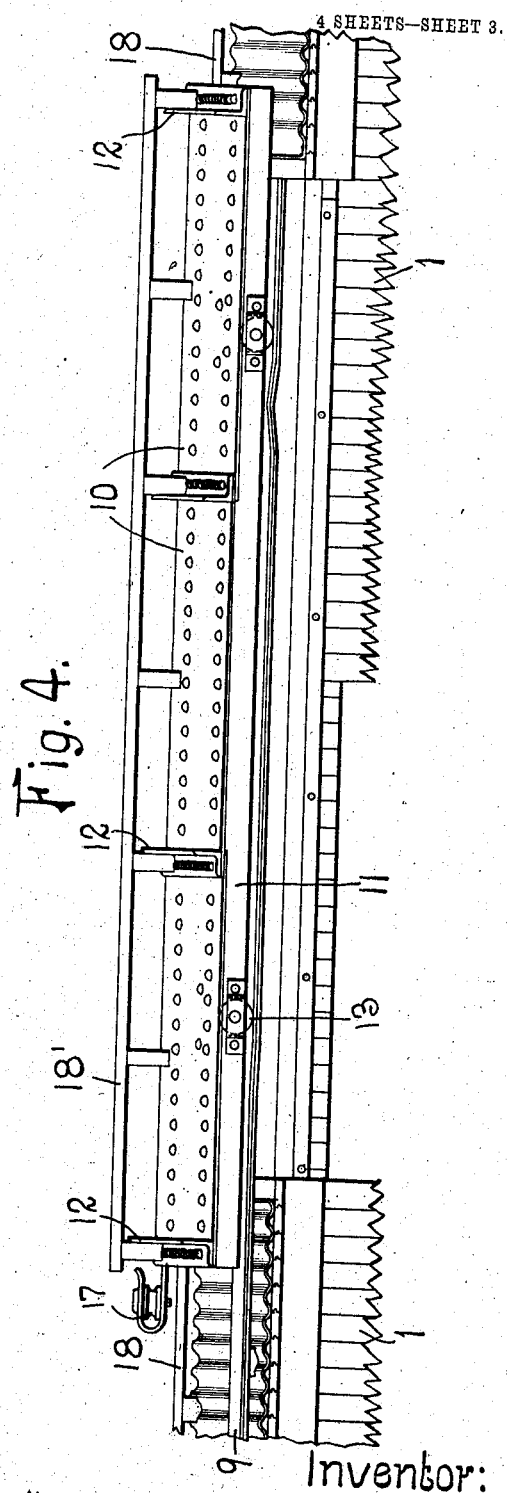

UNITED STATES PATENT OFFICE.

JULIUS C. HERRMANN, OF ST. LOUIS, MISSOURI, ASSIGNOR TO AMERICAN CAR & FOUNDRY COMPANY, OF ST. LOUIS, MISSOURI, A CORPORATION OF NEW JERSEY.

CAR-ROOF DOOR.

No. 824,077. Specification of Letters Patent. Patented June 19, 1906.

Application filed February 1, 1906. Serial No. 298,996.

*To all whom it may concern:*

Be it known that I, JULIUS C. HERRMANN, a citizen of the United States, residing at St. Louis, Missouri, have invented a certain new and useful Improvement in Car-Roof Doors, of which the following is a full, clear, and exact description, such as will enable others skilled in the art to which it appertains to make and use the same, reference being had to the accompanying drawings, forming part of this specification, in which—

Figure 1 is a plan view of a car-roof provided with a door embodying the features of my invention. Fig. 2 is a transverse sectional view of the parts shown in Fig. 1. Fig. 3 is a longitudinal sectional view through approximately the center of the roof and door. Fig. 4 is a side view of the roof and door. Fig. 5 is a detail view showing the locking means at one end of the door which prevents it from being raised; and Fig. 6 is a view similar to Fig. 4, showing a modified form of my invention.

This invention relates to freight-cars; and the object of the invention is to provide a freight-car having a large opening in its roof, which is closed by a door of novel construction.

One essential feature of a freight-car is that it shall have a roof which is absolutely water-tight, and great trouble has been experienced in trying to produce a water-tight car-roof having an opening closed by a door. With this object in view I have devised a roof-door which is so constructed that it is impossible for rain or snow to enter the car through the opening in the roof which the door closes.

Another object of my invention is to provide a car having an opening in its roof extending approximately the full width of the car, which opening is closed by a door that is so constructed that the rigidity of the car is not lessened any by said opening.

Referring to the drawings, which represent the preferred form of my invention, 1 designates the sides of a car provided with a roof 2, preferably formed of corrugated sheet metal and having an opening 3, which extends approximately the full width of the roof, said opening being longer than it is wide. Extending from side to side of the car at the ends of said opening are carlines 4, which are mortised to receive the usual ridge-pole 5 and purlins 6, and connected to each of said carlines by bolts is a cross-ridge 7 of approximately the form shown in Fig. 2, said ridge extending above the surface of the corrugated roof, which is connected thereto, as shown in Fig. 3, so as to form a water-tight joint. Preferably each carline is protected by an angle 8, connected to its lower edge and extending a portion of its length.

The door which closes the opening above referred to normally rests on said cross-ridges and runs on tracks 9, which are connected to the roof, and said door is preferably made up of sheet-metal plates 10, riveted together, said door being strengthened by longitudinally-extending angles 11 and transversely-extending angles 12, secured, respectively, to the under side and to the upper side of the door. It should be understood, however, that the door need not necessarily be formed of plates and strengthened by angles, as corrugated metal could be used and other commercial shapes could be used as the strengthening means without departing from the scope of my invention.

The tracks 9 are formed of angles, which are so disposed with relation to the longitudinal angles 11 at the sides of the door that it is impossible for rain or snow to enter the opening which the door closes. The door is provided at each side with two sets of rollers 13 and 15, which travel on said tracks, the rollers 13 traveling on the horizontal web of the track and the rollers 15 traveling on the vertical web of the track, as shown in Fig. 2. By mounting the rollers in this manner a very rigid construction is insured, and the door is held securely in position. As shown in Fig. 4, the upper edge of the vertical portions of the tracks is provided with inclines, so that when the door is opened the rollers riding up said inclines will raise the door off the cross-ridges, and thus provide a clearance for the heads of the rivets which secure the plates of the door together and also the rivets which secure the transversely-extending angle at the rear end of the door. The cross-ridge at the left-hand side of the door-opening is provided with openings or notches 16 to provide a clearance for the intermediate angles 11, and the rollers 15 and plates 24 are fastened to the underneath side of the door to cover said notches when the door is closed. The door is provided at its forward end with a pulley 17 to receive any suitable mechanism for opening the door. The roof of the car is provided with the usual running-boards 18, and the door is also provided with running-boards 18', which form a continuation of the running-boards on the car-roof. The door may be locked by any suitable device, and I have herein shown one of the end cross-ridges as having a perforated device 21, which projects through an opening in a hasp 22, fastened to the underneath side of the door, as shown in dotted lines in Figs. 1 and 3.

To prevent the rearward end of the door from being raised, the cross-ridge 7 at the right-hand side of the door-opening is provided with a plurality of plates 26, each having a slot that receives the vertical leg of a longitudinally-extending angle 11, the horizontal leg of the angle being removed, as shown in Fig. 5, to permit the vertical leg to enter the slot in said plate. The plate 26 also acts as a buffer or wear plate to be engaged by the horizontal leg of the angle 11 when the door is moved into position to close the opening. If desired, the opening can be closed by a pair of doors, which in construction are practically the same as the single door, this form being shown in Fig. 6.

From the foregoing description it will be seen that I have provided a door which is very strong, but not cumbersome, so that it can be easily operated, and, moreover, is so constructed that the roof of the car is perfectly water-tight.

Having thus described my invention, what I claim as new, and desire to secure by Letters Patent, is—

1. A box-car provided with a roof having an opening therein, a closure for said opening, said closure extending beyond all sides of said opening when in operative position, guides carried by the roof for said closure to travel on, and vertical rollers interposed between said closure and said guides; substantially as described.

2. A box-car provided with a roof having an opening therein, a closure for said opening, longitudinally-extending guides for said closure, rollers interposed between said closure and said guides, and inclined surfaces on said guides adjacent to the rollers when the closure is in operative position whereby said closure will be raised to provide for a clearance of underlying parts when it is moved into inoperative position; substantially as described.

3. A car having a roof provided with an opening, a closure for said opening, rollers for supporting said closure, longitudinally-extending guides coöperating with said rollers, inclined surfaces on said guides and horizontally-disposed rollers on the under side of the closure for preventing wedging thereof and keeping it in proper alinement; substantially as described.

4. A box-car having a roof provided with an opening, a door slidingly mounted on the roof for closing said opening, a projecting member on said door, and a cross-ridge provided with a socket which coöperates with the projecting member on the door when it is in operative position to prevent the door from being displaced; substantially as described.

5. A car provided with an approximately peaked roof having an opening therein, ridges projecting above said roof around said opening, a door covering said opening and projecting beyond said ridges, rollers for supporting said door, a projecting member at one end of said door for engaging a coöperating stationary member, and a coöperating hasp and eye at the opposite end of the door to enable it to be locked in position; substantially as described.

6. A car having a roof provided with an opening, carlines extending from side to side of the car at the ends of said opening, cross-ridges connected to said carlines and projecting above the surface of the roof, tracks at the sides of said opening, a door closing said opening and normally resting on said cross-ridges, and rollers carried by said door; substantially as described.

7. A car provided with a roof having an opening therein, cross-ridges located at the ends of said opening and projecting above the roof, a door closing said opening and provided with strengthening devices on its underneath side, openings in one of said cross-ridges to provide a clearance for said strengthening devices, and means connected to the door for closing the openings in the cross-ridge when the door is closed; substantially as described.

In testimony whereof I hereunto affix my signature, in the presence of two witnesses, this 26th day of January, 1906.

JULIUS C. HERRMANN.

Witnesses:
WELLS L. CHURCH.
GEORGE BAKEWELL.